United States Patent
Hu et al.

(10) Patent No.: US 10,189,347 B2
(45) Date of Patent: Jan. 29, 2019

(54) ENGAGING DEVICE FOR WHEEL AND WHEEL SET HAVING REMOVABLE POWER MODULE

(71) Applicant: INDUSTRIAL TECHNOLOGY RESEARCH INSTITUTE, Hsinchu (TW)

(72) Inventors: Chia-Jui Hu, New Taipei (TW); Chou-Zong Wu, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 231 days.

(21) Appl. No.: 15/388,162

(22) Filed: Dec. 22, 2016

(65) Prior Publication Data
US 2018/0154760 A1 Jun. 7, 2018

(30) Foreign Application Priority Data
Dec. 1, 2016 (TW) .............................. 105139698 A

(51) Int. Cl.
*B60K 7/00* (2006.01)
(52) U.S. Cl.
CPC .... *B60K 7/0007* (2013.01); *B60K 2007/0038* (2013.01); *B60K 2007/0092* (2013.01)
(58) Field of Classification Search
CPC .......... B60K 7/0007; B60K 2007/0092; B60K 2007/0038; B62M 6/60; B62M 6/65
USPC ............... 301/6.1, 6.5, 6.6; 180/206.5, 206.6
See application file for complete search history.

(56) References Cited

U.S. PATENT DOCUMENTS

| | | | |
|---|---|---|---|
| 3,770,073 A | 11/1973 | Meyer | |
| 4,420,995 A | 12/1983 | Roberts | |
| 5,495,904 A | 3/1996 | Zwaan et al. | |
| 8,991,532 B2 | 3/2015 | Wei et al. | |
| 2014/0159468 A1* | 6/2014 | Heinen | B60K 7/0007 301/6.3 |
| 2014/0183930 A1* | 7/2014 | Wei | A61G 5/1032 301/6.5 |
| 2015/0108823 A1* | 4/2015 | Figuered | B60K 7/0007 301/6.4 |

FOREIGN PATENT DOCUMENTS

| | | |
|---|---|---|
| CN | 102407761 A | 4/2012 |
| CN | 203976359 U | 12/2014 |
| EP | 0528235 B1 | 10/1995 |
| TW | 244918 | 4/1995 |

(Continued)

*Primary Examiner* — S. Joseph Morano
*Assistant Examiner* — Jean W Charleston
(74) *Attorney, Agent, or Firm* — Muncy, Geissler, Olds & Lowe, P.C.

(57) ABSTRACT

An engaging device for a wheel is provided. The engaging device includes a wheel hub and a transmitting member. The wheel hub is located in the center of a wheel. The wheel hub has a plurality of engaging holes. The transmitting member has a plurality of grooves, wherein an elastic member is provided in each of the grooves. One end of the elastic member is connected to the groove, and the other end of the elastic member is connected to an engaging member. The shapes of the engaging members and the engaging holes correspond to each other, so that the engaging members fit into the engaging holes.

18 Claims, 6 Drawing Sheets

(56) References Cited

FOREIGN PATENT DOCUMENTS

| TW | 479515 U | 3/2002 |
| TW | 570124 | 1/2004 |
| TW | M302359 | * 11/2006 |
| TW | M302359 | 12/2006 |
| TW | M378079 U | 4/2010 |
| TW | M443521 | 12/2012 |
| TW | I412213 | 10/2013 |
| TW | M 488458 U | 10/2014 |
| TW | I561430 | 12/2016 |

* cited by examiner

ENGAGING DEVICE FOR WHEEL AND WHEEL SET HAVING REMOVABLE POWER MODULE

This Application claims the benefit of Taiwan Application Serial No. 105139698, filed Dec. 1, 2016, the disclosure of which is incorporated by reference herein in its entirety.

TECHNICAL FIELD

The disclosure relates in general to a wheel set, and more particularly to an engaging device for a wheel and a wheel set having a removable power module.

BACKGROUND

In the market of electric wheel set, the frame of the electrical power assist vehicle is connected to at least one wheel, and in the center of each wheel there is a wheel hub, which is fastened to the frame using bolts. For the convenience of delivery, the electric wheel set normally can be removed from the frame of the electrical power assist vehicle. However, it is not easy to remove the electric wheel set from the frame of the electrical power assist vehicle and in most cases the wheel and the power module need to be removed together. Once the electric wheel set is removed from the electrical power assist vehicle, the electrical vehicle, having no power, cannot function normally and the removing process needs to be assisted by extra operator. Besides, even if the power module can be removed alone, many alignment problems will arise during installation. For example, due to the influence between the stop mechanism, the gear mechanism, and the clutch mechanism, the installation of the power module requires many times of angle adjustment, and therefore greatly decreases the user's willingness for installation and jeopardizes the convenience of installation.

SUMMARY

The disclosure is directed to an engaging device for a wheel having a quick-release function and dispensing with the alignment requirement during installation such that the user can easily perform installation and uninstallation.

The disclosure is directed to a wheel set having a removable power module, which has a quick-release function capable of reducing the weight of the wheel set to facilitate the delivery of the wheel set.

According to one embodiment, an engaging device for a wheel is provided. The engaging device includes a wheel hub and a transmitting member. The wheel hub is located in the center of a wheel. The wheel hub has a plurality of engaging holes. The transmitting member has a plurality of grooves, wherein an elastic member is provided in each of the grooves. One end of each elastic member is connected to one of the grooves, and the other end of each elastic member is connected to an engaging member. The shapes of the engaging members and the engaging holes correspond to each other, so that the engaging members fit into the engaging holes.

According to another embodiment, a wheel set having a removable power module is provided. The wheel set includes a wheel, a power module and an engaging device. The engaging device is for arranging the power module on the wheel. The engaging device includes a wheel hub and a transmitting member. The wheel hub is located in the center of a wheel. The wheel hub has a plurality of engaging holes. The transmitting member has a plurality of grooves, wherein an elastic member is provided in each of the grooves. One end of each elastic member is connected to one of the grooves, and the other end of each elastic member is connected to an engaging member. The shapes of the engaging members and the engaging holes correspond to each other, so that the engaging members fit into the engaging holes.

The above and other aspects of the invention will become better understood with regard to the following detailed description of the preferred but non-limiting embodiment(s). The following description is made with reference to the accompanying drawings.

Figure 1:
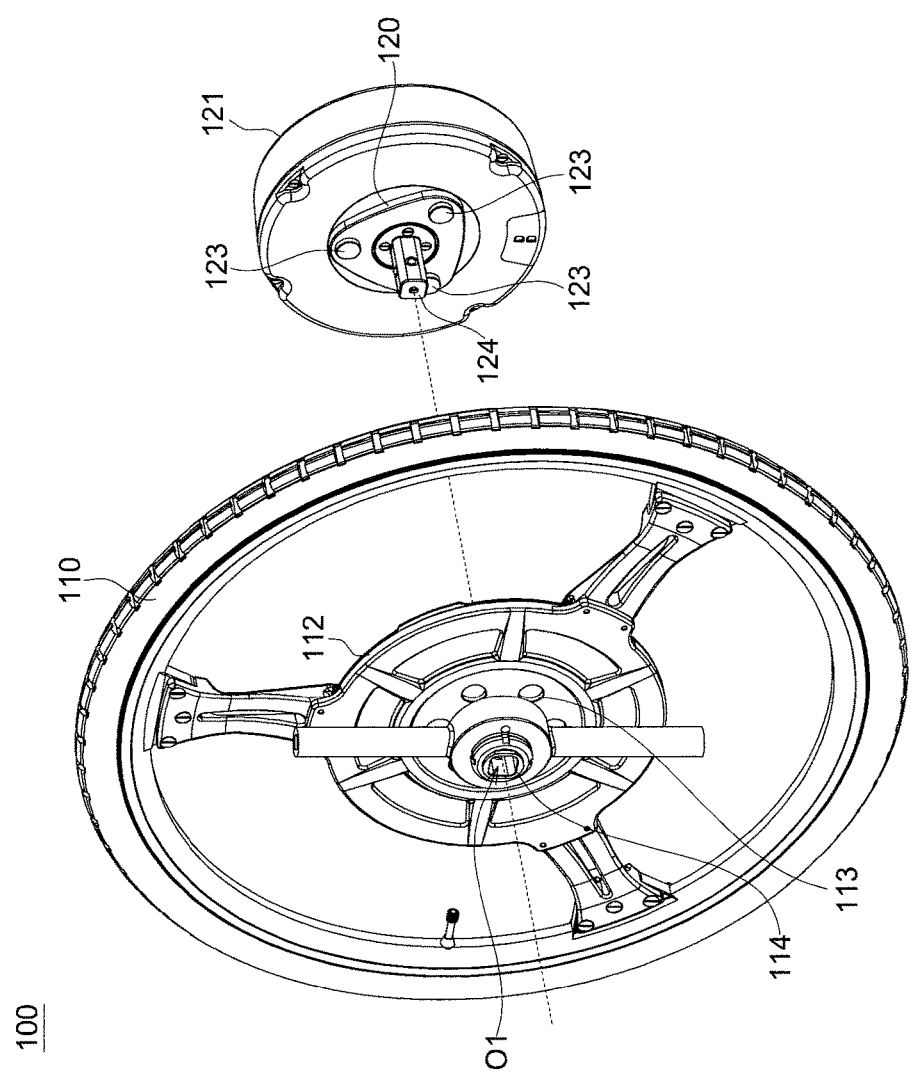
FIG. 1 is an explosion diagram of a wheel set having a removable power module according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the invention are disclosed below with a number of embodiments. However, the disclosed embodiments are for explanatory and exemplary purposes only, not for limiting the scope of protection of the disclosure.

Figure 2:
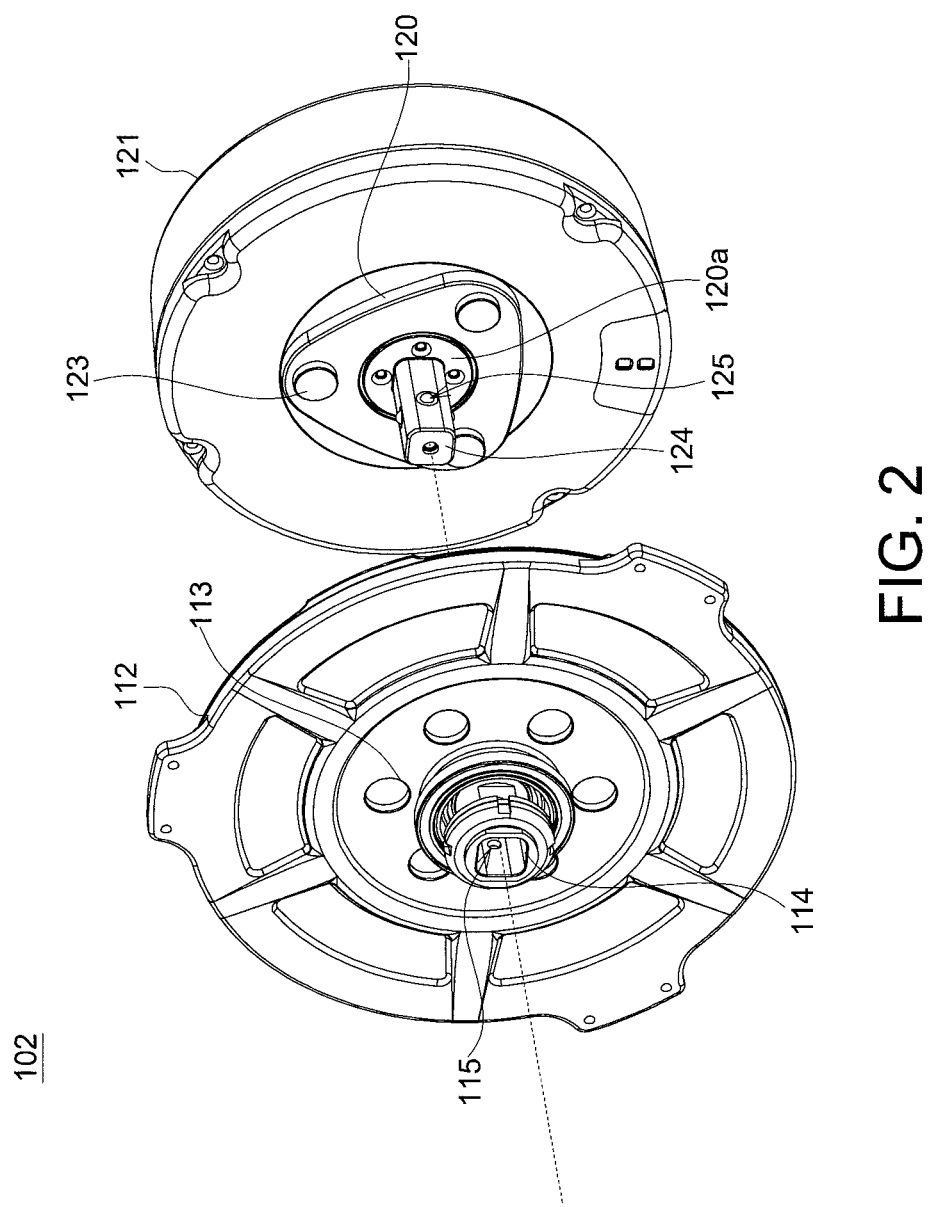
FIG. 2 is an explosion diagram of an engaging device for a wheel of FIG. 1.

Refer to FIG. 1 and FIG. 2. The engaging device 102 for a wheel 110 according to an embodiment of the disclosure includes a wheel hub 112 and a transmitting member 120. The wheel hub 112 is located in the center of the wheel 110, and has a plurality of engaging holes 113. The transmitting member 120 is coupled to a power module 121 such as a motor or an electric motor, and the engaging device 102 is for arranging the power module 121 on the wheel 110 to form a wheel set 100 having a removable power module 121.

In an embodiment, the wheel set 100 having a removable power module 121 can be used in a transportation vehicle such as an electric wheelchair, an electric motorbike or an electric bicycle. With the quick-release function of the wheel set 100, the user can remove the power module 121 on his or her own and therefore the weight of the wheel set 100 is reduced to facilitate the delivery of the wheel set 100. Furthermore, after the power module 121 is removed from the wheel set 100, the wheel set 100 still can provide an ordinary wheel function, and there is no need to remove the wheel 110 which has been fastened to an electric wheelchair, an electric motorbike or an electric bicycle.

Refer to FIGS. 1 and 2. In an embodiment, the engaging device 102 includes a central hole 114 and a central shaft 124. The central hole 114 is located at the center of the wheel hub 112. The central shaft 124 can be fastened and connected to a shaft fastening portion 120a located at the center of the transmitting member 120. The shapes of the central shaft 124 and the central hole 114 correspond to each other, such that the central shaft 124 can fit into the central hole 114. In an embodiment, the central shaft 124 can be a cuboid, the central hole 114 can be a rectangular hole, and the shapes of the cuboid and the rectangular hole correspond to each other, such that the rotation stopping function can be achieved. However, the shape of the central shaft 124 is not limited to a cuboid and other type of abnormal-shaped shaft would also do. The shape of the central hole 114 is not limited to a rectangular hole, and other type of abnormal-shaped hole would also do.

Figure 4A:
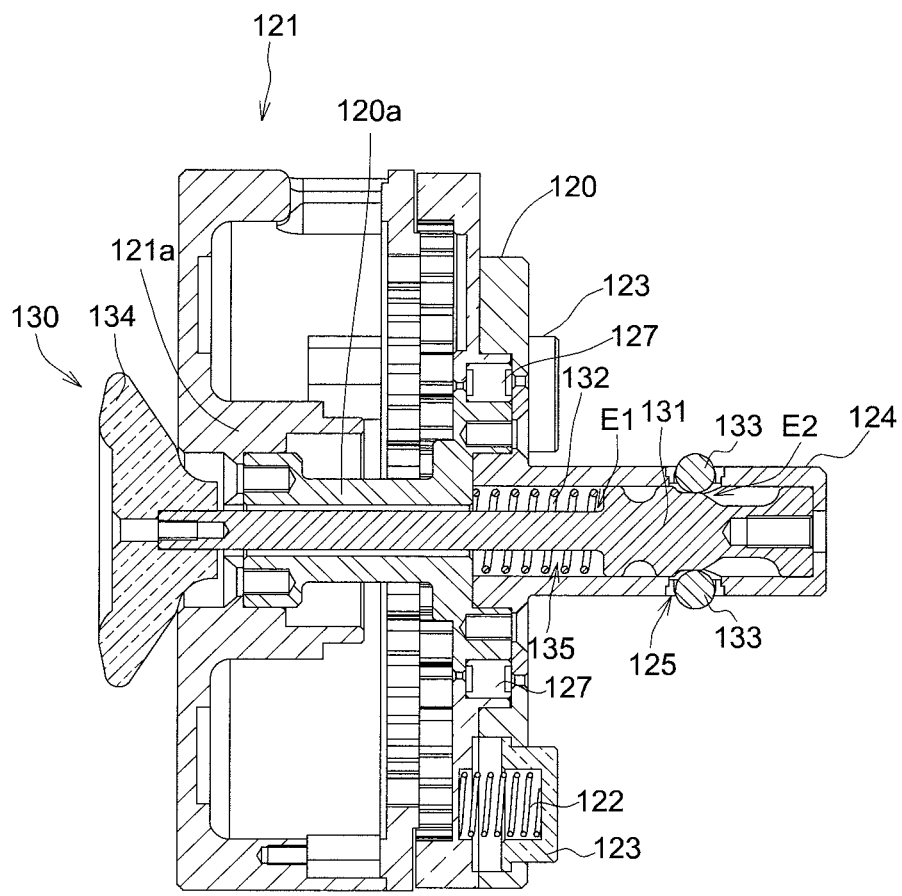
FIGS. 4A and 4B are a cross-sectional view of a central shaft disposed on a transmitting member and an actuation diagram of a lock mechanism disposed in the central shaft.
Figure 4B:
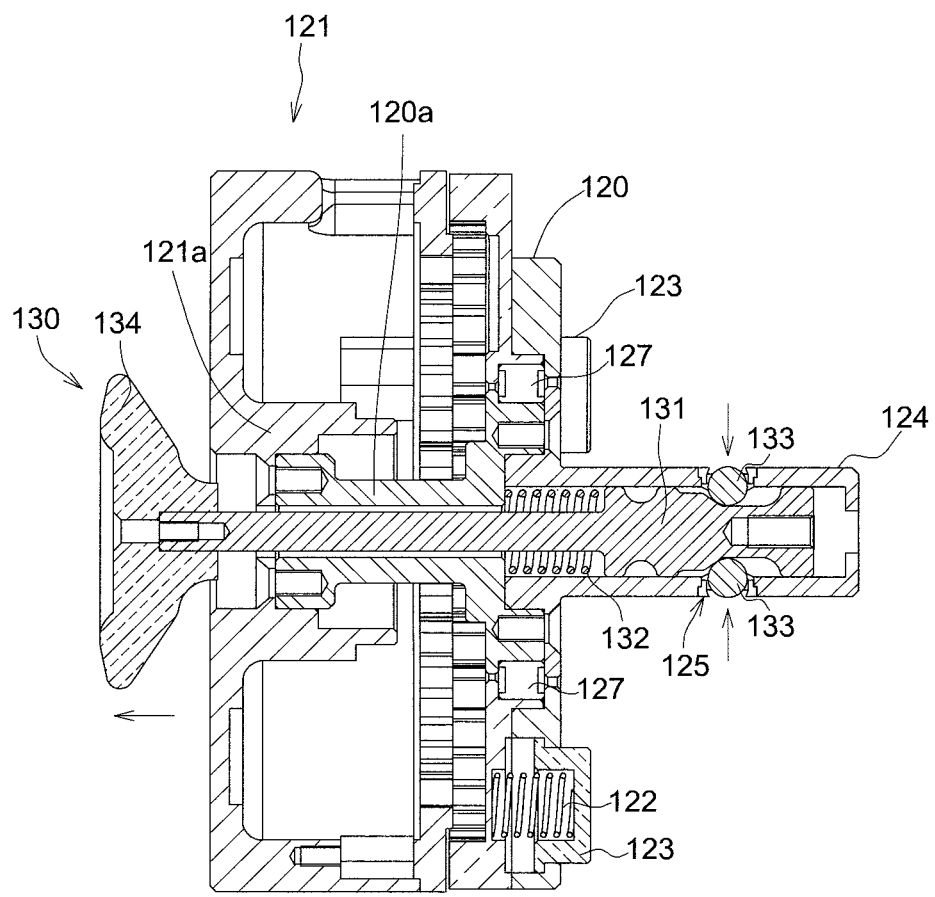

In an embodiment, the shaft fastening portion 120a is fastened and connected to a casing 121a of the power module 121 (as indicated in FIGS. 4A and 4B), and the central shaft 124 and the shaft fastening portion 120a are separated from the transmitting member 120 by a bearing 127. Therefore, when the power module 121 drives the transmitting member 120 to rotate, the central shaft 124 does not rotate with the transmitting member 120. Besides, the bearing (not illustrated) is located at the center of the wheel hub 112, and the central hole 114 is separated from the wheel hub 112 by the bearing. Therefore, when the wheel hub 112 rotates, the central hole 114 does not rotate with the wheel hub 112.

In an embodiment, the wheel hub 112 has a plurality of engaging holes 113, the transmitting member 120 has a plurality of engaging members 123, and the quantity of engaging holes 113 is larger than or equivalent to the quantity of engaging members 123, such that the probability of having successful alignment can be increased. For example, the quantity of engaging holes 113 is 6, the quantity of engaging members 123 is 1~6, and the shapes of the engaging members 123 and the engaging holes 113 correspond to each other, such that the engaging members 123 can fit into the engaging holes 113. In the present embodiment, the quantity of engaging holes 113 is 6, and the quantity of engaging members 123 is 3, which is only a half of the quantity of engaging holes 113. Therefore, the operator can slightly rotate the wheel hub 112 or drive the power module 121 to slightly rotate the transmitting member 120, such that the engaging holes 113 and the engaging members 123 can be aligned with each other. Each engaging hole 113 is at the same distance from the center O1 of the wheel hub 112. That is, the engaging holes 113 are arranged around the central hole 114 of the wheel hub 112 at an equal distance. In another embodiment, the engaging holes 113 can be engaged with the engaging members 123 through different forms of arrangement or different shapes.

Figure 3A:
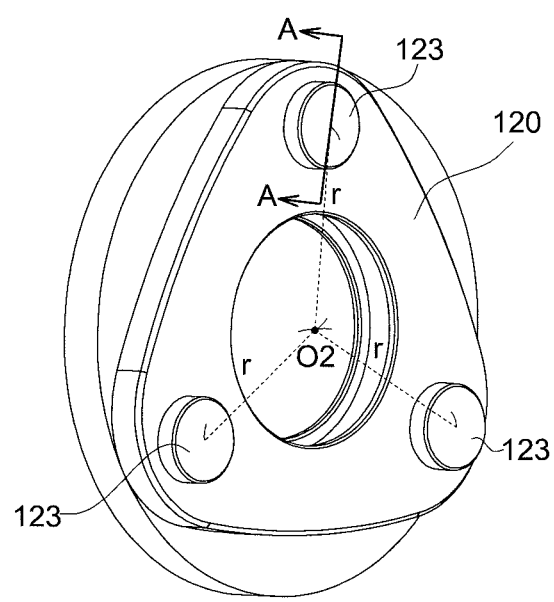
FIG. 3A is an external view of an engaging member disposed on the transmitting member.
Figure 3B:
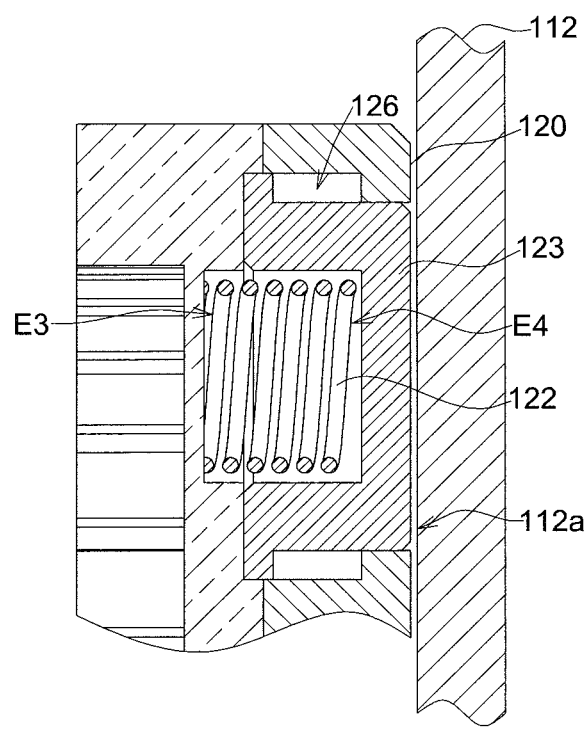
FIG. 3B is a cross-sectional view of the engaging member of FIG. 3A along a cross-sectional line A-A being pressed.
Figure 3C:
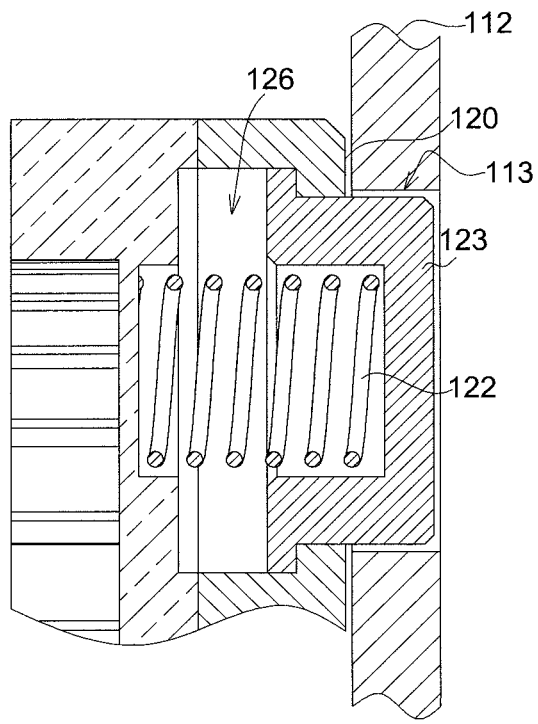
FIG. 3C is a cross-sectional view of the engaging member of FIG. 3A along a cross-sectional line A-A being released.

Refer to FIGS. 3A, 3B and 3C. The transmitting member 120 has a plurality of grooves 126 in each of which an elastic member 122 is provided. One end E3 of the elastic member 122 is connected to the groove 126, and the other end E4 of the elastic member 122 is connected to an engaging member 123. That is, the engaging member 123 can be located inside or outside the groove 126 through compressing or stretching the elastic member 122. The quantity of engaging members 123 is equivalent to the quantity of grooves 126. For example, the quantity of engaging members 123 and the quantity of grooves 126 both are 3. In an embodiment, each groove 126 (and the engaging member 123) is at the same distance r from the center O2 of the transmitting member 120 (refer to FIG. 3A). That is, the grooves 126 and the engaging members 123 are arranged around the central shaft 124 of the transmitting member 120 at an equal distance. In another embodiment, the engaging members 123 can be engaged with the engaging holes 113 through different forms of arrangement or different shapes. However, in terms of the rotary motion, the arrangement of having an equal distance between the engaging members 123 and the center O2 of the transmitting member 120 is preferred.

Refer to FIG. 3B. When the engaging members 123 and the engaging holes 113 are not aligned with each other, the engaging members 123 and the elastic members 122 are pressed by the surface 112a of the wheel hub 112 surrounding the engaging holes 113 to be received in the groove 126, such that the engaging members 123 cannot fit into the engaging holes 113. Under these circumstances, the operator can slightly rotate the wheel hub 112 or drive the power module 121 to slightly rotate the transmitting member 120. After the engaging members 123 and the engaging holes 113 are aligned with each other, as indicated in FIG. 3C, the engaging member 123 can be pushed outside the groove 126 by the elastic member 122 and fit into the engaging hole 113, such that the power can be transmitted to the wheel hub 112 through the transmitting member 120 to fulfill the transmission function.

Refer to FIG. 2 and FIGS. 4A and 4B. The engaging device 102 further includes a lock mechanism 130 disposed in the central shaft 124 for fastening and connecting the central shaft 124 to the central hole 114. In an embodiment, exemplarily, the central hole 114 has at least one recess 115 on the periphery, the central shaft 124 has at least one hole 125 on the periphery, and the positions of the recess 115 and the hole 125 correspond to each other. The lock mechanism 130 includes a sliding block 131, a spring 132 and at least one locking member 133. The sliding block 131 can slide along the axial direction of the central shaft 124. The sliding block 131 has a specific geometric shape, and at least includes a first surface E1 and a second surface E2. The first surface E1 of the sliding block 131 is connected to the spring 132. The lock mechanism 130 further includes a handle 134 connected to the sliding block 131 and extended to the outside of the central shaft 124, such that the operator can pull the sliding block 131 using the handle 134. Furthermore, the locking member 133 is located on the second surface E2 of the sliding block 131, and can slide vertically with respect to the axial direction of the central shaft 124. In an embodiment, the locking member 133 can be a rolling ball or other element. The rolling ball can pass through the hole 125 of the central shaft 124 to be engaged in the recess 115 of the central hole 114 to perform fastening along the axial direction.

Refer to FIGS. 4A and 4B. The axial movement of the sliding block 131 generate rise and fall on the contact surface between the sliding block 131 and the locking member 133, such that the locking member 133 leaning on the sliding block 131 can move vertically to be pushed out or received within. In FIG. 4A, one end of the spring 132 contacts and connects to a sliding groove 135 and the other end contacts and connects to the sliding block 131, such that after the sliding block 131 receives a preload force from the spring 132 and pushes out the locking member 133, the locking member 133 can pass through the hole 125 of the central shaft 124 to be engaged with the recess 115 of the central hole 114 to fulfill a fastening function. In FIG. 4B, when the sliding block 131 is pulled, the spring 132 is compressed, such that the locking member 133 falls down and is received in the hole 125 of the central shaft 124. Meanwhile, the central shaft 124 and the central hole 114 are not engaged, so that the user can easily remove the power module 121.

According to the above disclosure, the engaging device 102 for a wheel 110 and the wheel set 100 having a removable power module 121 disclosed in above embodiments possess rotation stopping function, fastening function and transmitting function. During the installation, when the central shaft 124 which is fastened and connected to the casing 121a of the power module 121 is inserted into the central hole 114 of the wheel hub 112, the rotation of the power module 121 can be stopped. Meanwhile, the sliding block 131 is pulled to the unlocking position by the operator, such that the locking member 133 is released. Once the sliding block 131 arrives at the correct lock position, the sliding block 131 is released. Then, the spring 132 loads the sliding block 131 and pushes out the locking member 133, such that the locking member 133 is engaged with the recess 115 on the periphery of the central hole 114, and the power module 121 can thus be fastened. Furthermore, when the engaging members 123 located on the transmitting member 120 is not aligned with the engaging holes 113, the operator can slightly rotate the wheel hub 112 or drive the power module 121 to slightly rotate the transmitting member 120. After the engaging members 123 and the engaging holes 113 are aligned with each other, the engaging members 123 can be pushed to the outside of the groove 126 by the elastic member 122 and fit into the engaging holes 113, and the transmission function can thus be fulfilled.

The wheel set and the engaging device of the disclosure provide quick-release function and reduce alignment requirement during installation. The user can remove the power module to reduce the weight of the wheel set to facilitate the delivery of the wheel set. Furthermore, after the power module is removed from the wheel set, the wheel set still can provide an ordinary wheel function, and there is no need to remove the wheel which has been fastened to an electric wheelchair, an electric motorbike or an electric bicycle.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An engaging device for a wheel, comprising:
   a wheel hub located in a center of a wheel, wherein the wheel hub has a plurality of engaging holes; and
   a transmitting member having a plurality of grooves, wherein an elastic member is provided in each of the grooves in such a way that one end of each elastic member is connected to one of the grooves and the other end of each elastic member is connected to an engaging member, wherein
   the shapes of the engaging members and the engaging holes correspond to each other, such that the engaging members fit into the engaging holes.

2. The engaging device according to claim 1, wherein, the quantity of engaging holes is larger than or equivalent to the quantity of engaging members, and the quantity of engaging members is equivalent to the quantity of grooves.

3. The engaging device according to claim 1, wherein each of the engaging holes is at the same distance from a center of the wheel hub, and each of the grooves is at the same distance from a center of the transmitting member.

4. The engaging device according to claim 1, wherein each of the engaging members is located inside or outside each of the grooves through the elastic member.

5. The engaging device according to claim 1, wherein the transmitting member is coupled to a power module.

6. The engaging device according to claim 1, further comprising:
   a central hole located at a center of the wheel hub; and
   a central shaft located on a shaft fastening portion at a center of the transmitting member and fastened to the shaft fastening portion, wherein
   the shapes of the central shaft and the central hole correspond to each other, such that the central shaft fits into the central hole.

7. The engaging device according to claim 6, further comprising:
   a lock mechanism disposed in the central shaft for fastening the central shaft to the central hole.

8. The engaging device according to claim 7, wherein the central hole further has at least one recess on the periphery, the central shaft further has at least one hole on the periphery, the positions of the recess and the hole correspond to each other, and the lock mechanism comprises:
   a sliding block movable along an axial direction of the central shaft, wherein the sliding block at least comprises a first surface and a second surface;
   a spring connected to the first surface of the sliding block; and
   at least one locking member located on the second surface of the sliding block, wherein the locking member is vertically movable with respect to the axial direction of the central shaft and the locking member passes through the hole of the central shaft to be engaged with the recess of the central hole.

9. The engaging device according to claim 8, wherein the locking member is a rolling ball.

10. A wheel set having a removable power module, comprising:
    a wheel;
    a power module; and
    an engaging device for arranging the power module on the wheel, wherein the engaging device comprises:
    a wheel hub located in a center of the wheel, wherein the wheel hub has a plurality of engaging holes; and
    a transmitting member having a plurality of grooves, wherein an elastic member is provided in each of the grooves in such a way that one end of each elastic member is connected to one of the grooves and the other end of each elastic member is connected to an engaging member, wherein
    the shapes of the engaging members and the engaging holes correspond to each other, such that the engaging members fit into the engaging holes.

11. The wheel set according to claim 10, wherein, the quantity of engaging holes is larger than or equivalent to the quantity of engaging members, and the quantity of engaging members is equivalent to the quantity of grooves.

12. The wheel set according to claim 10, wherein, each of the engaging holes is at the same distance from a center of the wheel hub, and each of the grooves is at the same distance from a center of the transmitting member.

13. The wheel set according to claim 10, wherein each of the engaging members is located inside or outside each of the grooves through the elastic member.

14. The wheel set according to claim 10, wherein the transmitting member is coupled to a power module.

15. The wheel set according to claim 10, further comprising:
a central hole located at a center of the wheel hub; and
a central shaft located on a shaft fastening portion at a center of the transmitting member and fastened to the shaft fastening portion, wherein
the shapes of the central shaft and the central hole correspond to each other, such that the central shaft fits into the central hole.

16. The wheel set according to claim 15, further comprising:
a lock mechanism disposed in the central shaft for fastening the central shaft to the central hole.

17. The wheel set according to claim 16, wherein the central hole further has at least one recess on the periphery, the central shaft further has at least one hole on the periphery, the positions of the recess and the hole correspond to each other, and the lock mechanism comprises:
a sliding block movable along an axial direction of the central shaft, wherein the sliding block at least comprises a first surface and a second surface;
a spring connected to the first surface of the sliding block; and
at least one locking member located on the second surface of the sliding block, wherein the locking member is vertically movable with respect to the axial direction of the central shaft and the locking member passes through the hole of the central shaft to be engaged with the recess of the central hole.

18. The wheel set according to claim 17, wherein, the locking member is a rolling ball.

* * * * *